(12) United States Patent  (10) Patent No.: US 7,131,907 B2
Miida et al.  (45) Date of Patent: Nov. 7, 2006

(54) SYSTEM AND METHOD FOR SUPERIMPOSING AN IMAGE ON ANOTHER IMAGE IN A VIDEO GAME

(75) Inventors: Toshiaki Miida, Tokyo (JP); Katsuyasu Ando, Tokyo (JP); Mamoru Sugihara, Tokyo (JP); Toshihiro Nagoshi, Tokyo (JP); Jun-ichi Yamada, Tokyo (JP); Hisashi Endo, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 141 days.

(21) Appl. No.: 10/078,673

(22) Filed: Feb. 21, 2002

(65) Prior Publication Data

US 2003/0112233 A1  Jun. 19, 2003

(30) Foreign Application Priority Data

Feb. 22, 2001 (JP) ............................. 2001-047434
Apr. 16, 2001 (JP) ............................. 2001-117363

(51) Int. Cl.
*A63F 9/24* (2006.01)

(52) U.S. Cl. ........................................................ 463/8
(58) Field of Classification Search .................. 463/8, 463/9, 33
See application file for complete search history.

(56) References Cited

U.S. PATENT DOCUMENTS 5,649,861 A * 7/1997 Okano et al. ................. 463/30

FOREIGN PATENT DOCUMENTS

JP  2998096  11/1999

OTHER PUBLICATIONS

Declaration of Kathleen Mosser.*
Origin's Official Guide to Ultima Online, Frase, et al., Origin, 1997, Title page.*

* cited by examiner

*Primary Examiner*—Corbett Coburn
(74) *Attorney, Agent, or Firm*—Finnegan, Henderson, Farabow, Garrett & Dunner, L.L.P.

(57) ABSTRACT

An image processing device which places a display object within a virtually-defined three-dimensional space, creates a picture of the display object viewed from a virtual viewpoint with the image processing device, and displays the picture on a display. The image processing device comprises a display body setting element for setting a plurality of display bodies within said three-dimensional space; a display body disposal element for overlappingly disposing one of the plurality of display bodies within the display object, a display body image setting element for setting an image of the display object such that the one of the plurality of display bodies housed within the display object becomes visible, and a display body movement mode reflection element for making at least one movement mode of the one of the plurality of display bodies reflect a movement mode of the display object.

9 Claims, 15 Drawing Sheets

SYSTEM AND METHOD FOR SUPERIMPOSING AN IMAGE ON ANOTHER IMAGE IN A VIDEO GAME

BACKGROUND OF THE INVENTION

1. Technical Field of the Invention

The present invention generally relates to an information processing device and system for processing information of image data or the like, and in particular relates to a display control method of images in which an object visually changes in a 3D image based on a prescribed game program determined in advance, an image processing method and device thereof, and a recording medium and game device having recorded thereon such image display control method.

2. Description of the Related Art

Pursuant to the development of computer graphics technology in recent years, simulation devices and game devices have become widely popular for both business use and domestic use.

The screen thereof is composed such that a background screen and objects in such background screen move pursuant to a computer program or controller instructions, and changes and operations in accordance with the game are executed thereby.

Here, depending on the game content, it is necessary to display information with various texts or symbols regarding the explanation of the rules, explanation of the operation, the progress and the result of the scores, and the life gauge if the object has operational limitations. In such a case, a display area is provided to the upper or corner section, for example, of the screen. This prevents the objects displayed on the screen from becoming overlapped as much as possible, and enables the clear display of information by precisely distinguishing the background screen.

Nevertheless, depending on the game content, when a display of text or the like is made on the screen as though a telop, there is a possibility that the realistic sensation will decrease when the player plays the game, and the balance of the image may deteriorate.

For instance, in a screen envisioning outer space, when a display such as text is made on the part of a screen while the player is enjoying the game feeling as though he/she is in outer space, the amusement of the game may decrease and the realistic sensation may be lost.

This is not limited to the display of text, and, for example, applies similarly to the case of a life gauge or the like which represents the life volume of an object with the length of a strip-shaped graph.

Although the foregoing examples refer to those which are, in principal, displayed constantly, there are those which are displayed on the screen in a prescribed timing. As a representative example thereof, there are cases of displaying a text such as "game start" or "game over", and such text is overlapped and displayed irrespective of the game screen. This type of sporadic text display also lacks the sense of unity with the game screen, and may cause the deterioration of the game amusement.

Moreover, a life gauge or the like is information which must be watched from point to point, and if the object position and the life gauge position are apart from each other, the player is required to move his/her viewpoint. Not only is this a complicated task, but this may also cause the player to fatigue easily.

Meanwhile, in general an object in a game scores points or wins/loses pursuant to some types of action, and, among such actions, there are ordinary actions, and special actions (the so-called finishing blows or secret moves) used in particular circumstances. Since the operations for using the special actions are complex, the player usually wishes to concentrate on such operations. Nevertheless, in a game, the player must concentrate on the position of the object, position of the opponent, operational timing and so on, and in actuality it is difficult for the player to concentrate on the operation of the special actions. Further, it is possible that the player will only operate in one of the actions; that is, either in the standard action or the special action. It is therefore necessary to establish some kind of merit/demerit when implementing the special actions.

Next, as a means for reinforcing the object as the main character, there is a technique of generating an aura around this object. An aura is an image processing which expresses the object in the center of the background to be conspicuous, and there is a mode where lines are radially emanated from the center of the object, and a mode where a gradational screen is provided around the object.

Conventionally, a circular plate polygon was generated from the center (for example, near the bellybutton) of an object (mainly of a human shape), and the normal vector thereof was set to constantly face the camera viewpoint. It is thereby possible to form a circular aura around the object no matter which position such object is facing. This, however, appears strange since the aura is not emanated along the contour of the object.

Moreover, as another method of generating an aura, there is a method of forming an aura with plate polygons around the skeletal polygons of the respective parts structuring the object.

According to this method, the contour of the object and the contour of the outermost periphery of the aura will have the same shape (similar figure), and would not appear unnatural.

Nevertheless, although this method is capable of being compatible with a certain degree of motion of the object, when the object faces abeam against the camera viewpoint, for instance, since the plate polygons will lose its third dimension, there is an instant where the aura disappears. In addition, there are also cases where the aura disappears when the skeletal polygons overlap.

In order to accurately generate an aura coinciding with the contour of the object, it is most preferable to extract the contour of the object. This, however, requires a commeasurable processing capacity of the CPU in addition to the processing time becoming significantly long, and there are cases where this is not able to keep up with the game progress.

Moreover, with a conventional image processing device, the movement of the character and a controller display area for displaying the operational status of the controller for instructing the movement of such object were displayed on the screen. Thus, the player was required to pay particular attention to both the movement of the character and the display of the operational status of the controller. This generates cases where the player is not able to make appropriate operations since his/her attention is diverted.

Japanese Patent Publication No. 2998086 therefore provided a controller display area overlapping with the character. In this conventional art, however, the player is not able to determine the controller display area from the back of the character, nor able to determine the moving direction of the character from the controller display area.

SUMMARY OF THE INVENTION

The present invention was devised in view of the foregoing facts, and a first object thereof is to provide an image display control method in a 3D image and the device thereof, as well as a recording medium and game device having recorded thereon such image display control method, which enables the player to maintain the virtual feeling in the game without losing the balance of the image by displaying text or the like as though a telop on the screen, and which is capable of preventing the deterioration in game amusement by yielding a sense of unity with the game screen even in a sporadic text display.

Moreover, the second object of the present invention is to obtain with certainty two or more types of information upon suppressing the shifting of the player's viewpoint as much as possible.

The third object of the present invention is to enable the player, when complex operations are necessary, to concentrate on such complex operation by simplifying other elements which ordinarily require consideration.

The fourth object of the present invention is to enable the generation of aura, which is means for reinforcing an object of a main character class, with simple image processing capable of matching the contour of such object and accommodating even complex movements.

Yet another object of the present invention is to provide a program for making a computer execute the image processing method or image processing means described later, or a storage medium storing such a program.

(Invention Relating to the Display of Background Image and Text, Etc.)

An image display control method in a 3D image whereby an object in a 3D image visually changes based on a predetermined prescribed game program, wherein a display character representing the game status is structured of an aggregate of polygons, and displayed as apart of the background in the screen of the game in progress.

Gradation is performed to the polygons.

An image display control method in a 3D image whereby an object in a 3D image visually changes based on a predetermined game program, wherein the 3D image comprises a life indicator for expressing a prescribed life volume of the object, and displaying the life indicator is controlled, such that the rate of decrease of the life indicator becomes higher in comparison to a standard movement when a special movement is designated.

The object is displayed at least in its contour, and the life indicator is provided within the object and moves together with the motion of the character.

An image display control method in a 3D image whereby an object in a 3D image visually changes based on a predetermined game program, wherein text information having significance in the game is displayable in the 3D image, and displaying the text information is controlled, such that the text information is displayed in a state where a plurality of fragments are dispersed in the displayed image, and the fragments gradually assemble to create the text.

An image display control device in a 3D image whereby an object in a 3D image visually changes based on a predetermined prescribed game program, comprising: background image display means for displaying a background 3D image of the game in progress; a display character structured of an aggregate of polygons and which represents the game status; and mounting? means for mounting the display character as a part of the background image within the screen.

A gradation means is further provided for performing gradation such that the display character mounted with the mounting means stands out from the background 3D image.

An image display control device in a 3D image whereby an object in a 3D image visually changes based on a predetermined game program, comprising: life volume calculation means for calculating a prescribed life volume of the object; a life indicator for displaying the life volume calculated with the life volume calculation means on the 3D image; designation means for designating the movement of the object; and life volume correction means for correcting the rate of decrease of the life volume to be higher in comparison to a standard movement by controlling the calculation means when a special movement is designated to the object with the designation means.

The life indicator is disposed within the object displayed in 3D.

An image display control device in a 3D image whereby an object in a 3D image visually changes based on a predetermined game program, comprising: a plurality of fragments dispersed in the 3D image in the initial state and which becomes text information significant in the game by being aggregated in a prescribed combination; floatation movement means for floating and moving the fragments in the 3D screen; and positioning control means for performing control of positioning the fragments in their respective final coordinate positions in the 3D screen preset for each of the plurality of fragments, and structuring an aggregate with the plurality of fragments.

According to the foregoing invention, a sense of unity can be yielded between the display character representing the game status, and the three-dimensional background image. Further, by performing the gradation thereto, three-dimensionality is yielded, and it is thereby possible to clarify the display contents.

Since a life indicator representing the life volume is disposed within (inside the body of) the main character object, the viewpoint for the object and life indicator will match for the player, thereby improving visibility. Moreover, since the rate of decrease of the life volume is made higher during a special movement of the object in comparison to a standard movement, it is possible to prevent a player from leaning only toward the special movement, which is advantageous in the game progress.

Further, as a representation for representing text to be displayed sporadically, the text is made to be an aggregate of a plurality of fragments and, in the initial screen, these fragments are dispersed within the screen and gradually move to their respective predetermined positions in order to ultimately form the text. This yields a sense of unity with the screen and will not hinder the game progress.

(Invention Relating to Operability)

The movement of the object is a swing motion of a racket counter-stroking a spherical body, and a display control is made such that the contact point position of counter-stroking the spherical body with the racket is locked on at the time of the special movement, and the spherical body is counter-stroked at the contact point, for example, at a probability of 100% in synchronization with the swing motion.

A display control means is further provided for displaying the movement of the object as a swing motion of a racket counter-stroking a spherical body; wherein the display control means has lock-on means for locking on the spherical body to the counterstroke contact point position of the racket upon the special movement, and synchronization control means for synchronizing the swing motion and the movement of the spherical body such that the spherical body is counter-stroked at the contact point with a probability of 100%.

According to the foregoing invention, when the object holds a racket and is to swing the racket based on the player's operation, ordinarily, it is necessary to coincide the spherical body to be counter-stroked with the racket with an appropriate contact point position of the racket. Nevertheless, when implementing the special movement as described above, complex operations will become necessary for such special movement, and, since matching of the spherical body and the contact point position may become neglected, the player will feel displeasure. Thus, the spherical body and the contact point position are made to lock on when implementing the special movement, and even though in reality such point is somewhat deviant when the movement is commenced, this is automatically corrected in order to enable the counterstroke of the spherical body at an appropriate contact point position. The player is thereby able to concentrate on the complex operations accompanying the special movement.

(Invention Relating to the Reinforced Display of the Object)

An image display control method in a 3D image whereby an object in a 3D image visually changes based on a predetermined game program, irrespective of the display viewpoint of the object, a special image processing is constantly performed around the object.

The special image processing is at least of the following an image processing for displaying a plurality of radial lines from the contour of the object beginning at a predetermined center within the object to a position separated a prescribed distance; or an image processing for displaying a gradation within the area connecting the tips of radial lines in which the gradation sequence changes gradually from the center of the object.

A collision ball is set to the respective parts of the object, and the special image processing area is set based on the collision ball.

A projection plane is provided between the object and an object display viewpoint, a reference circle is set among the projection circles of the respective collision balls displayed on the projection plane, radial lines are generated for dividing around the center of the reference circle in N (N is an integral number larger than the number of collision ball projection circles excluding the reference circle) segments, an intersecting point is sought for the respective N number of radial lines and the farthermost position against the center of the reference circle of the respective collision ball projection circles, and the area surrounded by the lines connecting the adjacent intersecting points is set as the special image processing area.

An image display control device in a 3D image whereby an object in a 3D image visually changes based on a predetermined game program, comprising: viewpoint movement control means for displaying the object moving in a 3D screen by moving the viewpoint; and special image processing means for performing special image processing around the object in all viewpoints set with the viewpoint movement control means.

The special image processing means performs at least one of the following: an image processing for displaying a plurality of radial lines from the contour of the object beginning at a predetermined center within the object to a position separated a prescribed distance, or an image processing for displaying a gradation within the area connecting the tips of radial lines in which the gradation sequence changes gradually from the center of the object.

The special image processing means comprises a plurality of collision balls set to the respective parts of the object, and the special image processing area is set based on the collision balls.

The special image processing means comprises: reference circle setting means for setting a reference circle among a projection plane provided between the object and an object display viewpoint, and the projection circles of the respective collision balls displayed on the projection plane; radial line generation means for generating radial lines which divide around the center of the reference circle in N (N is an integral number larger than the number of collision ball projection circles excluding the reference circle) segments; intersecting point calculation means for calculating the intersecting point for the respective N number of radial lines and the farthermost position against the center of the reference circle of the respective collision ball projection circles; and special image processing area setting means for setting the area surrounded by the lines connecting the adjacent intersecting points as the special image processing area in the intersecting points calculated with the intersecting point calculation means.

According to the foregoing invention, irrespective of the display viewpoint of the object, an object can be reinforced and the vigor of the screen can be increased by constantly performing special image processing to the periphery of such object.

The special image processing is either a case of displaying a plurality of radial lines from the contour of the object beginning at a predetermined center within the object to a position separated a prescribed distance, or a case of not displaying the radial lines (i.e., making them transparent) and displaying a gradation within the area connecting the tips of radial lines in which the gradation sequence changes gradually from the center of the object. These may be represented alternately, or together.

As the procedure for generating the special image described above, a projection plane is provided between the object and an object display viewpoint, a reference circle is set among the projection circles of the respective collision balls displayed on the projection plane, radial lines are generated for dividing around the center of the reference circle in N (N is an integral number larger than the number of collision ball projection circles excluding the reference circle) segments, an intersecting point is sought for the respective N number of radial lines and the farthermost position against the center of the reference circle of the respective collision ball projection circles, and the area surrounded by the lines connecting the adjacent intersecting points is set as the special image processing area. Thereby, a representation corresponding to the contour of the object is constantly possible in accordance with the complex movement of the object.

DETAILED DESCRIPTION OF THE PREFERRED EMBODIMENTS

Figure 1:
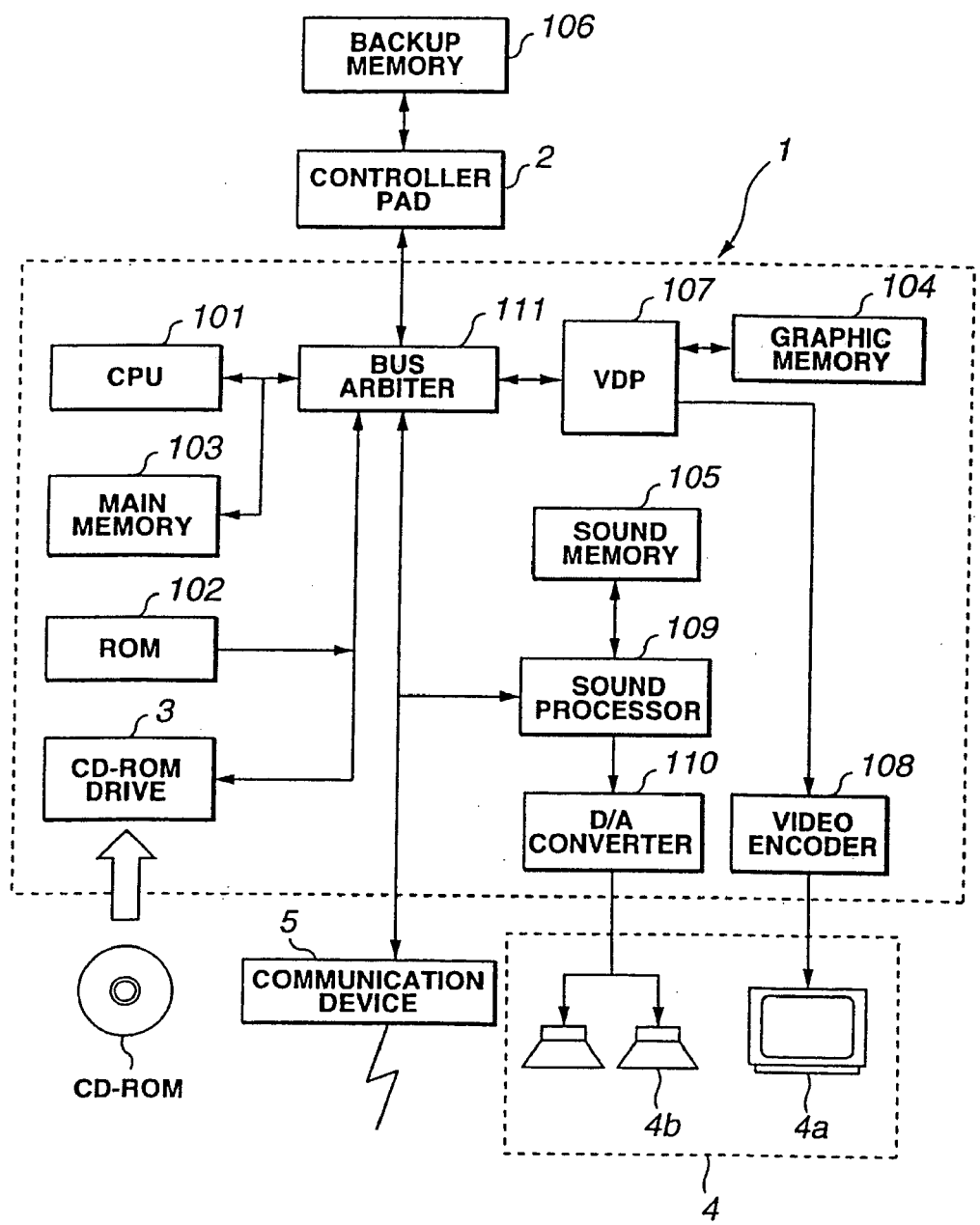
FIG. 1 is a block diagram of the game device according to an embodiment of the present invention.

FIG. 1 shows a structure of the game device having the image display control in a 3D image according to the present invention programmed therein. In FIG. 1, the game device comprises a control unit 1 structured mainly with a CPU 101 and the like, an input device 2 for a player to input operational signals into the control unit 1, an external storage device 3 storing an operating system (hereinafter referred to as "OS") and application programs (game programs) and which inputs such programs in the control unit 1 when necessary, and an output device 4 structured of a display device 4a and speaker 4b among others for providing images and sounds to the player. Further provided is a communication device 5 for transmitting and receiving data to and from other computers or game devices via a telephone line or the like. Without limitation to the CD-ROM or the like illustrated in the diagram, this may also be a recording medium capable of writing and retaining data from the control unit 1.

When the power is turned on to start the game, a boot program loader not shown loads the boot program (also referred to as an initial program) stored in the ROM 102 into the CPU 101, and the CPU 101 executes this boot program. In accordance with this boot program, the CPU 101 loads all or the necessary portion of the OS stored in the CD-ROM or the like into the main memory 103, and executes the OS.

Under the control of this OS, the CPU 101 loads all or the necessary portion of the application program (hereinafter sometimes simply referred to as "program") stored in the CD-ROM or the like into the main memory 103, and, as required, loads the drawing data or image data stored in the CD-ROM or the like into the graphic memory 104, and loads the sound data into the sound memory 105.

The CPU 101 executes the application program stored in the main memory 104 under the control of the OS. Data accompanying the execution of the application program is written in the main memory 104 and backup memory as necessary, and referred to thereby. The backup memory 106 stores data in order to retain the pending status of the game even if the power source is cutoff due to the discontinuance of the game.

Moreover, in the present embodiment, although the OS and application program and the like are structured to be provided from a CD-ROM, for example, these may be structured to be supplied from a ROM or another computer via a network.

A video display processor (VDP) 107 reads the drawing data necessary for displaying the image stored in the graphic memory 104, performs various information processing (image processing) based on orders or data from the CPU 101 pursuant to the execution of the application program, and generates image data thereby. Various types of image processing are, for example, texture mapping, light source processing, display priority processing, and so on.

In order to display the generated image data on the display device 4a, the VDP 107 outputs this to the encoder 108. Further, the generated image data, for example, is written in the frame buffer memory or the like, and may be read in a prescribed timing from this frame buffer memory.

A sound processor 109 reads sound data stored in the sound memory 105, and performs various information processing (sound processing) based on orders and data from the CPU 101 pursuant to the execution of the application program. Various types of sound processing are, for example, effects processing, mixing processing, and so on. Sound data to which various sound processing has been performed thereto is converted into analog data with the D/A converter 110 and output to the speaker.

A bus arbiter 111 performs control between the various units connected with the data transmission channel (via the bus 9 or the like). For example, in order to determine the unit to occupy the bus, the bus arbiter 111 determines the priority between the respective units and allocates a bus occupancy time for the occupying unit.

The game device of the present invention structured as described above realizes the prescribed functions according to the present invention by executing the program read by the CPU 101 from the external recording medium such as a CD-ROM or the like.

(Summary of Game Contents)

Figure 2:
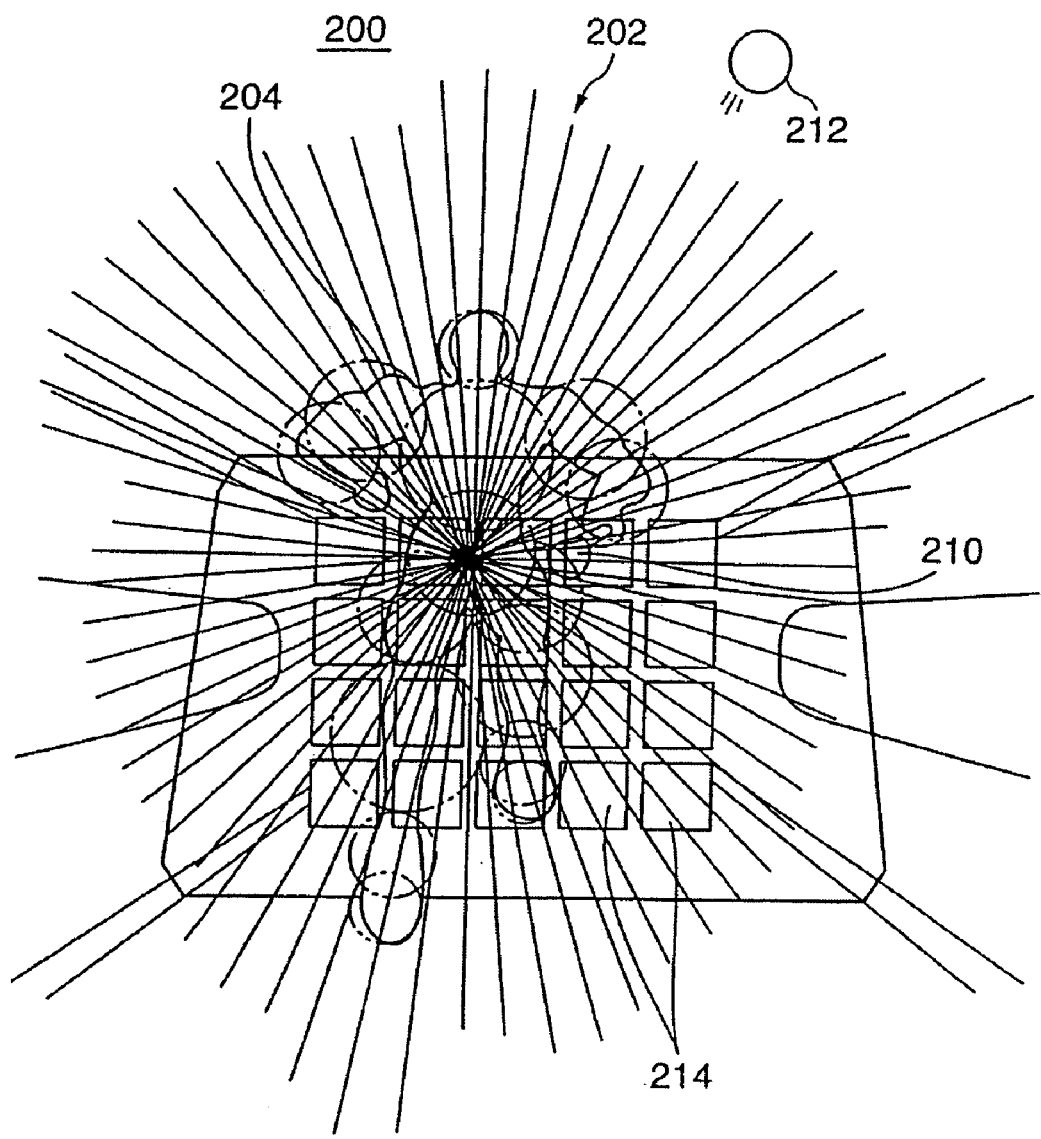
FIG. 2 is a front view showing a screen of the game device according to the present embodiment.

As shown in FIG. 2, the present game device displays a 3D image on the screen 200, and such 3D image can be broadly classified into a background image 202 and an object image (hereinafter simply referred to as "object") 204 which shifts and moves pursuant to the operation of the player.

The background image 202 corresponds to outer space, and the recreation room (room for playing "squash") entirely surrounded by walls (8 faces) corresponds to a room capable of displaying various viewpoints. Now referring to FIG. 4, the wall 206 viewed from the outside is controlled to be transparent. In other words, when viewing the room three-dimensionally from the front, the front wall and the ceiling are transparent. Further, when viewing this room from the lower oblique direction (from below), the ceiling will become opaque, and the floor will thereby become transparent.

The content of this game is where an object 204 as the main character enters into this recreation room, counterstrokes the ball 212 bouncing back from all the walls by swinging the racket 210 (refer to FIG. 6) held by the object 204, in order to destroy the plurality of blocks 214 provided to the rearmost wall 206D.

(Characteristic Items in this Game Device)

(1) Text representing the start and end is sporadically displayed at the start and end of the game.

(2) Displays of scores corresponding to the number of destroyed blocks and countdown of the time limit are displayed constantly during the game progress.
(3) A life volume is provided for the object 204, and the object 204 will not function if the game is not finished within a prescribed time. This life volume is displayed constantly.
(4) The object 204 is capable of performing a special action (so-called finishing blows or secret moves) pursuant to the operation of the player in contrast to a standard action. The rate of reduction is set to become higher when implementing this special action.
(5) An aura 216 is provided to the periphery of this object, and the object is displayed most conspicuously on the screen. Since this object 204 is in outer space, not only is it able to move freely across the floor and wall, it can also move along the left and right walls or the ceiling, and the image control is made so that the feet of the object 204 touches the nearest wall. An aura is image processing or image representation for making the object stand out from the background portion with fire, light or the like surrounding the object.
(6) The movement (swinging of the racket 210) of the object 204 is made to differ depending on the position of the approaching ball 212.

Each of the foregoing paragraphs (1) to (6) is described in detail below.

((1) Sporadic Text Display Control)

Figure 3:
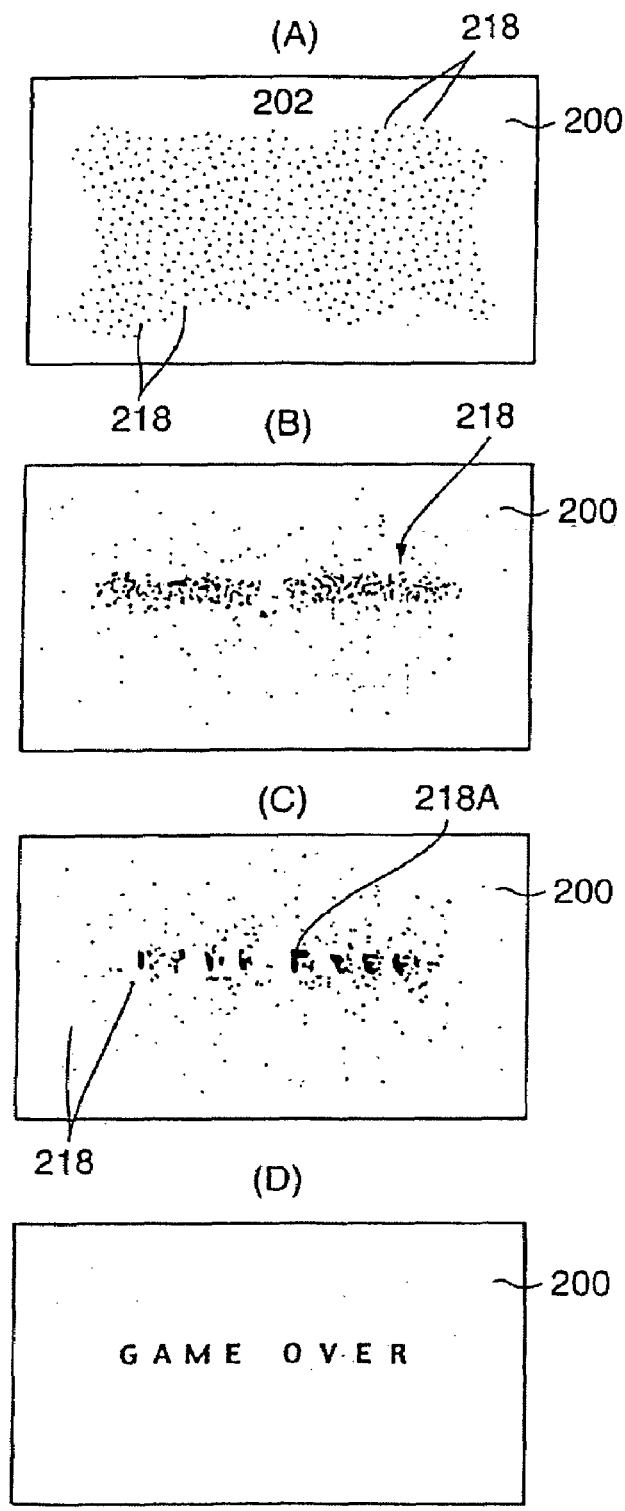
FIG. 3 is a front view of a screen showing the flow where the scattered fragments gradually form a text.

As shown in FIG. 3(A), the display shows a state where fragments (218) are dispersed throughout the screen 200. Here, since the situation is outer space, these fragments can be considered as stardust.

As shown in FIG. 3(B), each of such plurality of fragments 218 is structured of small polygons and provided with coordinates in advance, and gradually moves to the coordinate position of the ultimate position. Nevertheless, among the fragments 218, some move to their coordinate positions at the shortest distance possible, whereas others move while creating a circular or spiral shape. Therefore, they do not arrive at their respective coordinate positions at the same time.

As shown in FIG. 3(C), the fragments 218 connect with each other at the determined position of each coordinate, and the aggregate 218A thereof gradually forms some type of shape. Moreover, the fragments 218 which have not yet arrived at the coordinate position are floating around such shape.

As shown in FIG. 3(D), when all of the fragments 218 gather at a determined position of the coordinate position, they respectively form a text, and here, "GAME OVER" is displayed in a state it is recognizable by the player.

As described above, since stardust in the outer space gradually gathers, becomes connected, and forms an aggregate in order to represent a text, there is a sense of unity with the background image 202, and the player will not feel a sense of displeasure when such text is to be displayed sporadically.

Next, the detailed description of the image processing relating to the fragments is explained below. The game device shown in FIG. 1 executes the image processing described in paragraphs (1) to (6) above mainly by the CPU. The image processing means realized mainly by the CPU realizes the image processing to a three-dimensional image publicly known prior to the filing of the present application. In other words, the image processing means of the present invention is an image display control method which sets a three-dimensional spatial coordinate system and a three-dimensional viewpoint coordinate system for following the viewpoint movement, converts the coordinates of a first display body operated by a player belonging to the spatial coordinate system and a second display body other than the first display body belonging to the spatial coordinate system into the viewpoint coordinate system by employing a projection emitted from the viewpoint, and displays the display body disposed in a virtual three-dimensional space on a display screen.

The CPU loads necessary programs and data from a storage medium such as a CD-ROM storing game programs and game data into the main memory. And, with the support of the VDP and the like, the CPU foremost disposes the fragments in their initial positions. Next, the coordinate position of each fragment is read and stored in the main memory. Thereafter, the CPU reads the aggregate data table of the fragments among the data stored in the main memory, reads the final position of the fragments upon such fragments forming the aggregate, and stores this in a prescribed storage area of the main memory. The fragments are thereafter moved to their final positions.

The movement path of fragments is not particularly limited, and may be a preprogrammed path, the shortest linear distance sought from the current position of the fragments and the final position, and so on. The aggregate is a completed form of the image, text or the like upon executing the game. Text is information of letters or symbols significant in the game progress, and is the notification of game start or game over, game score, game time, and other explanations which are necessary during the game progress. One characteristic of the present embodiment is that the fragments which structure the aggregate—that is, the portion that forms the aggregate—is assimilated into the background image of the game. The fragments are assimilated as stardust into the background image of the outer space.

((2) Display Control of Constantly Displayed Text)

Figure 4:
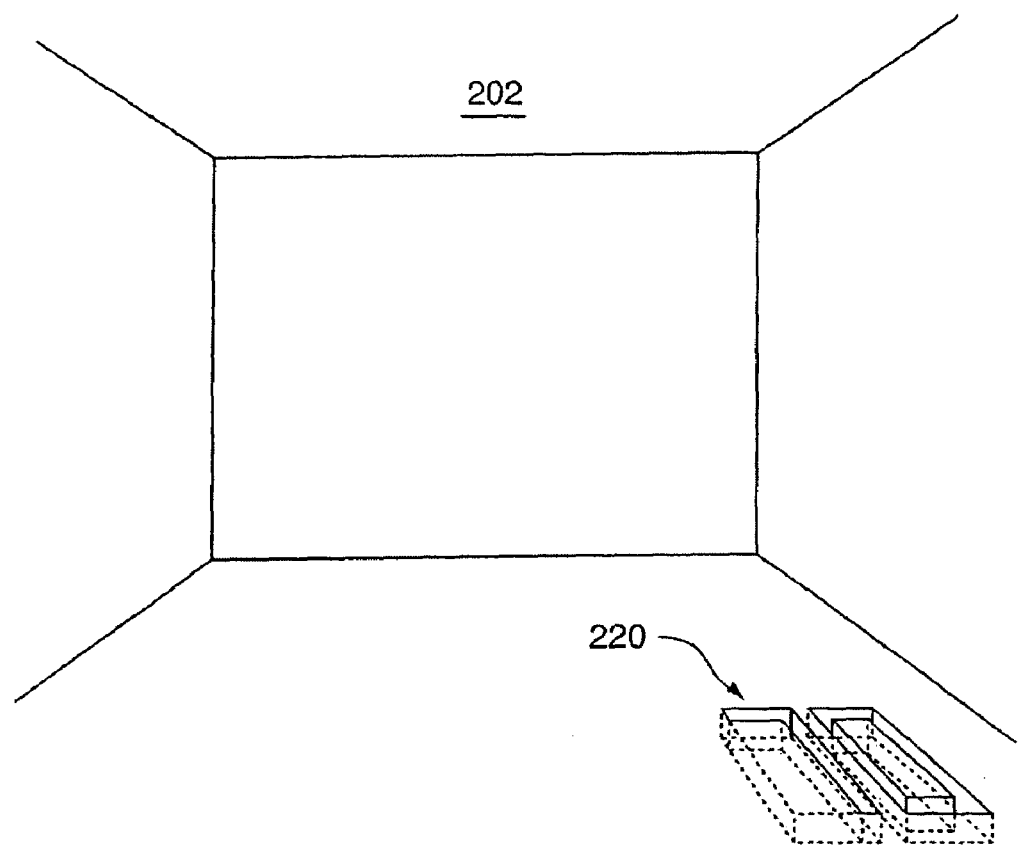
FIG. 4 is an enlarged front view of the floor and the wall portion of the background image.

As shown in FIG. 4, text 220 requiring constant display (here, an example of the countdown display of the time limit is used) is displayed on the floor/wall in the background image 202.

Figure 5:
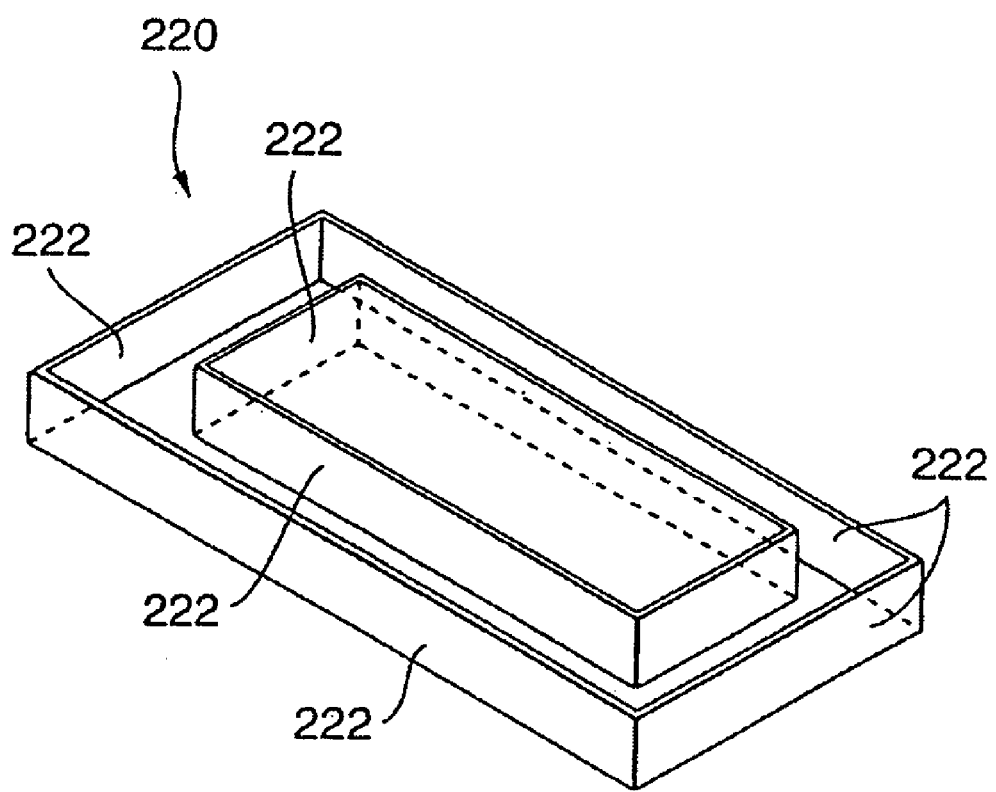
FIG. 5 is an exploded view of a character structured with plate polygons provided to the floor and the wall.

This text (number) 220, as shown in FIG. 5, is structured of an aggregate of plate polygons 222, which are a plurality of polygons. These polygons are disposed as a part of the object structuring the background. For example, the plate polygons are placed on the polygons structuring the background. Each of these plate polygons 222 is capable of being subject to gradation in accordance with the camera viewpoint, and, as a result, as shown in FIG. 4, is displayed in a three-dimensional state having concavities and convexities against the floor/wall 206C. Here, the method of displaying the text is as follows. Models and textures from 0 to 9 are prepared as data in the ROM for drawing per frame. These texts are formed with polygons, and structured from a bottom face and side face. A texture having the same shape as the polygon is affixed to the bottom face (for example, "red" is attached, and textures graded in proportion to the superimposed polygons are attached to the polygons on the side face).

Moreover, these plate polygons 222 cannot become the counterstroke face of the ball 212, and the floor/wall is judged as being planar. Next, the image processing in this case is described in detail. Gradation is semi-transparent processing, and an example of such gradation is to place the polygons On the background and perform gradation processing thereto, whereby the polygon color data and background color data are mixed in a prescribed ratio, and the polygons are colored lightly such that the player is able to see through such polygons to view the background in the rear. One reason for performing this type of processing is to assimilate the polygons into the background. When text such as points and remaining time are displayed in the background, there is a problem in that such text display stands out from the background. Thus, by performing gradation processing to the polygons structuring the text display, such text display becomes assimilated into the background.

In the foregoing embodiment, the floor area (background) to which the text display is placed and the angle formed with the virtual camera are calculated with the CPU. The virtual camera is placed in the vicinity of the main character, and moves in accordance with the movement of the main character. Gradation processing is performed when the camera angle is of a prescribed angle requiring such gradation processing, or when it is within a prescribed angle range. Pursuant to this gradation processing, the gradation of the area to be graded may be gradually changed.

((3) Establishment Place of Life Gauge)

Figure 6:
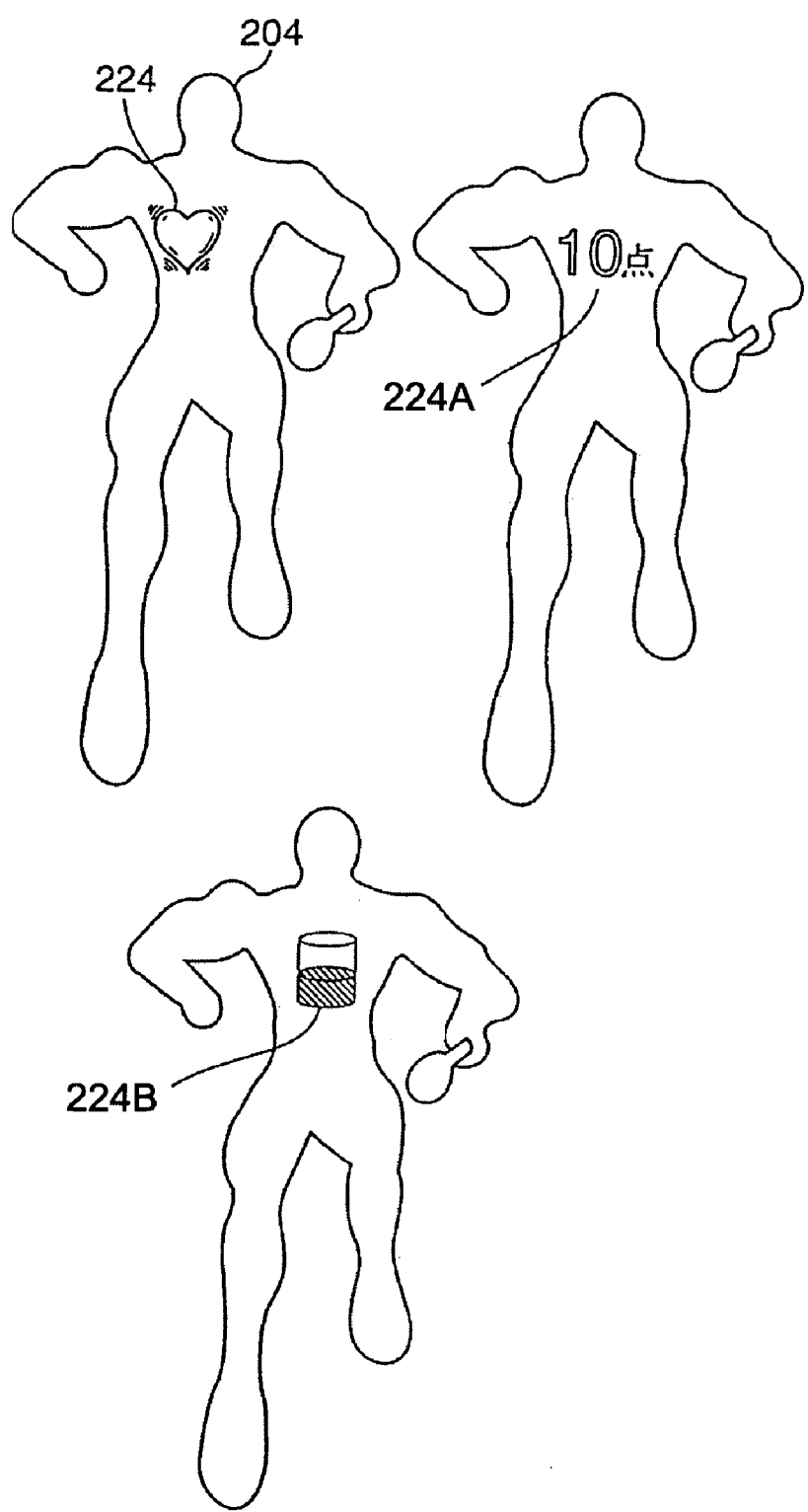
FIG. 6 is a front view of the object.

As shown in FIG. 6, the object 204 is basically transparent or semi-transparent, and only the contour thereof is displayed, and gradation is otherwise provided as necessary.

In the body of this object 204 near the heart, a heart-shaped life gauge 224 is displayed. The player is able to look through this. To summarize, this gauge corresponds to the display image reflecting the status in the game progress of the object processed in accordance with the instruction provided to the image processing device via the input device of the player. The aforementioned image processing means (CPU 101) detects or calculates the status of the object, and reflects this in the form, shape or movement of the gauge. The gauge is displayed overlapping on the object. The gauge moves simultaneously with the movement of the object as a part of such object. Here, a gauge is a part of the display image representing information on the object. The display image includes, in addition to the foregoing life gauge, other types of various display information such as symbols, text and graphics representing the game score, countdown of the time limit and so on.

The exemplified life gauge 224 is constantly positioned at the heart of the object 204, and, as a result, is controlled to move together with the movement of the object 204. Further, the life gauge can be, in addition to the heart shape and as also illustrated in FIG. 6, that which a number 224A, or it can be an indicator 224B.

Further, since the life gauge 224 is also a 3D image, this is displayed with slightly differing shapes depending on the direction of the object 204.

The scale of the life gauge 224 is represented by the speed of the contraction/expansion of the life gauge 224 itself. In other words, when the contraction/expansion of the life gauge 224 is slow, this implies that the heart is beating normally, and represents that sufficient life volume remains. Meanwhile, if the contraction/expansion of the life gauge 224 becomes fast, this is judged as an increased heartbeat, and represents that the life volume is beginning to decrease. For example, when the life volume becomes completely 0, the life gauge 224 may be destroyed.

Here, the number of objects to be displayed on the screen is not limited to one body, and a plurality of bodies may be displayed. In the latter case of a competition game, each player that becomes a participant in the competition game is able to operate an object, respectively. The foregoing display information can correspond to the game results of each object; that is, each player. The image processing device (CPU) of the game device can be made to be one of the opponents instead of a player. Since the display information representing the game result is displayed overlapping on the object, each player is able to instantly recognize the game result or game information of the object which he/she is operating. As a result, this is effective when a plurality of objects move around in the screen. The image processing means of the game device constantly monitors, calculates or determines the movement position of the object and overlaps such display information on this moving object in order to enable this processing. Here, if the display information is formed in a heart shape, the display information itself will become a part of the human organ, and the player will sense a prescribed reality.

Next, a modified example is described below. In other words, the CPU executes image processing of placing a second display body (life gauge) inside the first display body (object) such that the player is able to view the second display body through the first display body. Here, the second display body performs a rotational or oscillation movement, or periodic motion such as a reciprocating movement. This periodic motion varies depending on the motion property such as the movement speed of the first display body, or on the characteristics of the first display body. In other words, the periodic motion is controlled in correspondence with the game status of the character (parameters for determining the movement (status) of the character during the game progress such as the energy or physical strength of the character).

For example, when the motion speed of the first display body is fast, the periodic motion becomes fast. The CPU calculates the movement speed of the first display body. This calculation can be realized from the movement distance of the first display body and the number of frames required for such movement with respect to the movement speed of the display body. Further, the CPU may also read from the main memory the movement speed based on the series of motion data of the first display body.

((4) Movement Control of Special Action)

Figure 7:
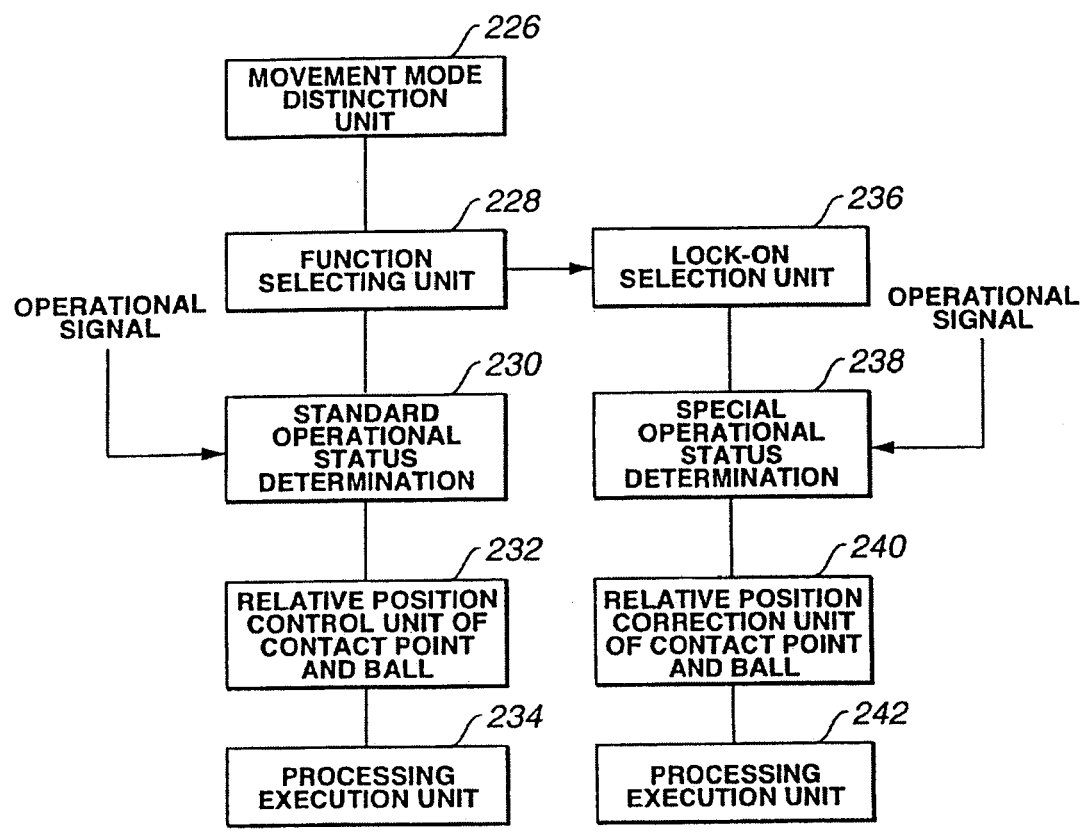
FIG. 7 is a control block diagram of the action movement.

FIG. 7 shows a functional block diagram for executing the movements of the special action and standard action.

The movement mode distinction unit 226 distinguishes whether a special action is being designated or a standard action is being designated based on the operational condition of the player, and sends the distinction result to the function selecting unit 228.

At the function selecting unit 228, a special action signal or a standard action signal is output based on the signal input from the movement mode distinction unit 226.

A standard action signal is sent to the operational status determination unit 230, and the operational status of the player of a standard action is determined, whereby such determination result is sent to the relative position control unit 232. At the relative position control unit 232, the relative position of the contact point of the racket 210 and the ball 212 is controlled as per the operation of the player, and sent to the processing execution unit 234. At this processing execution unit 234, images of the object 204 and the like are controlled based on the calculated movement.

Meanwhile, the special action signal in the function selecting unit 228 is sent to the lock-on setting unit 236. The lock-on setting unit 236 commences the movement pursuant to the input of this special action signal, and locks on the relative position of the contact point position of the racket 210 and the ball 212.

A lock-on is a movement where the ball 212 automatically follows the contact point of the racket 210 in accordance with the movement of the racket 210.

The lock-on setting unit 236 is connected to the operational status determination unit 238, and corrects the relative position of the contact point position of the racket 210 and the ball 212 by recognizing the player's operation and sending such operational status to the correction unit 240. In other words, the correction unit 240 corrects the position of the contact point of the racket 210 and the ball 212 in a state with a reduced sense of unnaturalness on the image display, and the processing execution unit 242 controls images of the object 204 or the like based on the calculated (corrected) movement.

Figure 8:
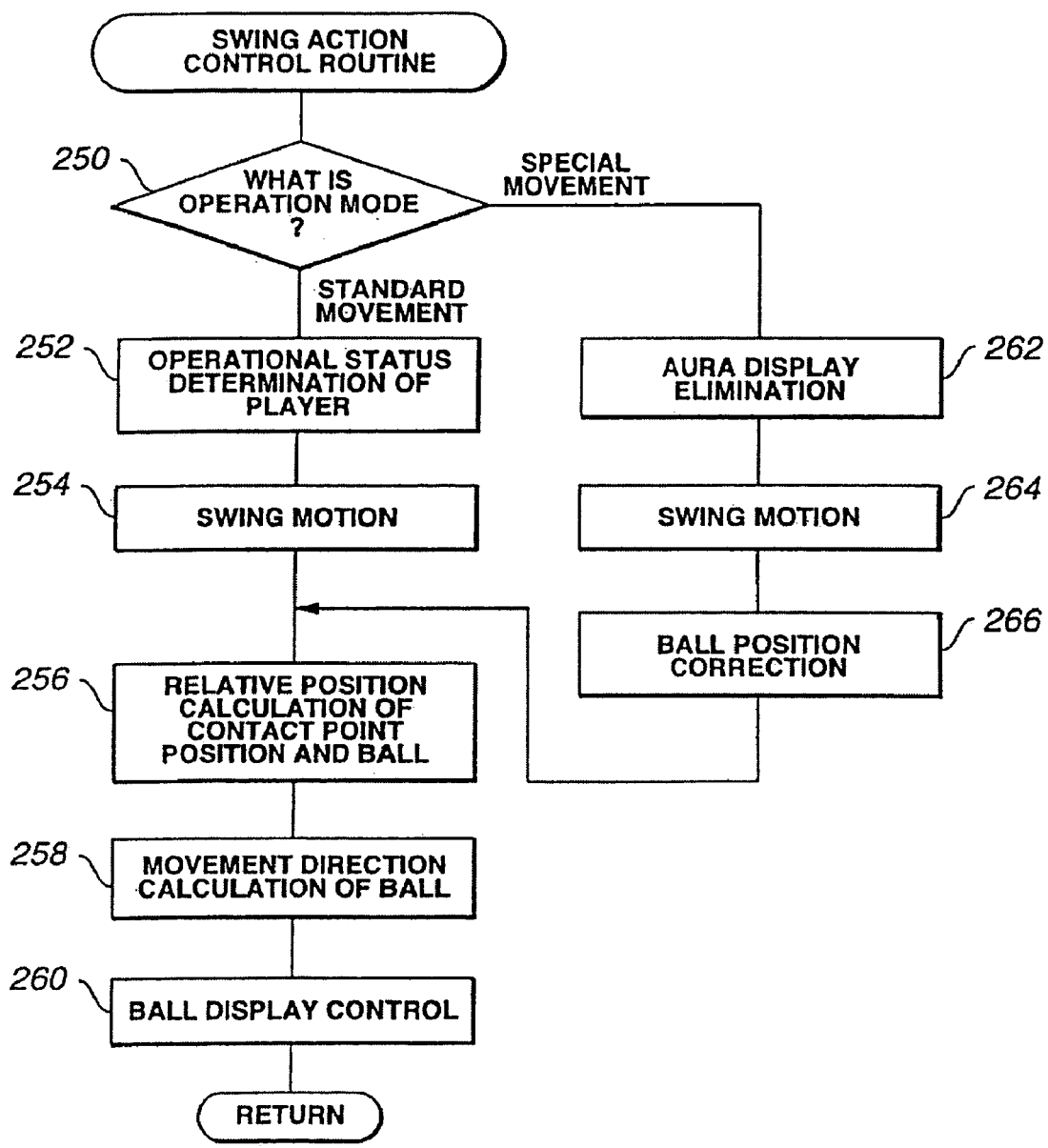
FIG. 8 is a control flowchart of the action movement.

The movement control including the swing of the racket 210 of the object 204 is explained in accordance with the flowchart of FIG. 8.

At step 250, the operational status (standard or special) is determined, and, when determined as being a standard action, the routine proceeds to step 252. The operational designation status by the player is thereby recognized, and, at the subsequent step 254, the swing motion of the racket 210 is commenced based on such recognized operational designation.

Here, a standard movement is an ordinary motion provided to the character during the game progress, and, for example, is a frequently used command such as the walking, running or jumping of the character. These motions correspond to the button or pad on the controller. A special movement (particular movement) is a motion used less frequently, but aims at an extraordinary movement of the character in comparison to the standard movement. For instance, this would be the object counter-stroking the ball while performing a back flip, or returning the ball while running backwards, and so on. This special movement, for example, corresponds to the operation of a plurality of buttons, and, when there are three types of buttons A, B and C, this special movement occurs to the character when the A button and B button are pressed simultaneously. Moreover, during such special movement, since it is difficult for the player to counter-stroke the ball accurately while giving the character such special movement, the movement path or speed of the ball is adjusted, controlled or interpolated toward the racket.

Next, at step 256, the relative positional relationship of the contact point of the racket 210 and the ball 212 is calculated, and at the subsequent step 258, the counterstroke direction of the ball 212 is calculated based on such calculation result. The routine then proceeds to step 260. At step 260, the movement of the ball 212 is display controlled based on the result calculated at step 258.

Here, there are cases where the ball 212 is hit toward an unexpected direction in accordance with the variance in the relative position of the contact point of the racket 210 and the ball 212. When the ball is miss-hit, the ball 212 flies toward a direction different from the direction intended by the player. Thus, it is not possible to hit the block 214 accurately, and the subsequent counterstroke may become difficult.

Meanwhile, when a special action is determined at step 250, the routine proceeds to step 262 in order to recognize the operational designation status of the player. Next, at step 264, the swing motion is commenced, and, at the subsequent step 266, the position of the ball 212 is corrected based on such recognized operational designation. The routine then proceeds to step 256. In other words, the ball 212 is moved so as to follow the contact point position of the racket 210.

Next, at the subsequent step 256, the relative positional relationship of the contact point of the racket 210 and the ball 212 is calculated, and at the subsequent step 258, the counterstroke direction of the ball 212 is calculated based on such calculation result. The routine then proceeds to step 260. At step 260, the display of the movement of the ball 212 is controlled based on the result calculated at step 258.

Here, since the position of the ball 212 is corrected (made to follow) in accordance with the movement of the racket 210, the ball 212 is counter-stroked accurately each time. It is thereby possible to hit the block 214 with accuracy.

As described above, in the case of a special action requiring difficult operations in comparison to a standard action, the player is able to concentrate on the operation of the special action by locking on the position of the contact point of the racket 210 and the ball 212.

((5) Aura on the Object)

Figure 9:
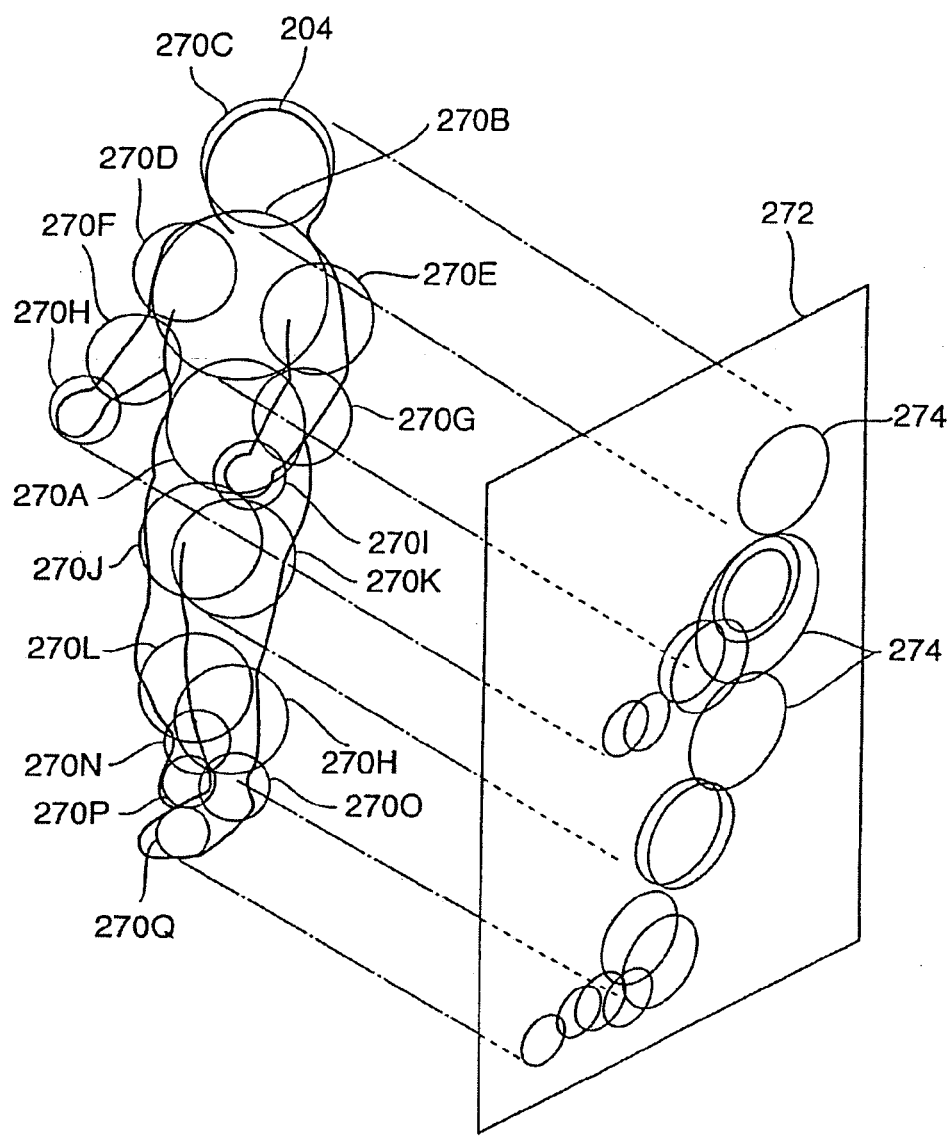
FIG. 9 is a perspective view showing the relationship between the polygons and projection screen and camera viewpoint.

As shown in FIG. 9, a plurality of collision balls 270 are provided to the object 204 in advance.

The collision balls 270 are structured of a first collision ball 270A provided at the waist position of the object and used as a reference; a second collision ball 270B provided to the chest position of the object 204; a third collision ball 270C provided to the face position of the object 204; fourth and fifth collision balls 270D and 270E provided to the upper arm portions of the object 204; sixth and seventh collision balls 270F and 270G provided to the lower arm portions of the object 204; eighth and ninth collision balls 270H and 270I provided to the wrist portions of the object 204; tenth and eleventh collision balls 270J and 270K provided to the thigh portions of the object 204; twelfth and thirteenth collision balls 270L and 270M provided to the knee portions of the object 204; fourteenth and fifteenth collision balls 270N and 270O provided to the ankle portions of the object 204; and sixteenth and seventeenth collision balls 270P and 270Q provided to the toes of the object 204.

Here, although the camera viewpoint for displaying this object 204 is able to move freely in the three-dimensional space, a two-dimensional projection screen 272 (transparent) is always provided on the line connecting this viewpoint and the object 204. The face of this projection screen (projection face) 272 is maintained perpendicular to the line connecting the viewpoint and the object 204. This projection face is placed as close as possible to the camera viewpoint. Thus, the aura described later can constantly be displayed even when there is an obstacle existing between the object 204 and the camera viewpoint. The player will be able to recognize the existence (aura) of the object via the obstacle.

Figure 10:
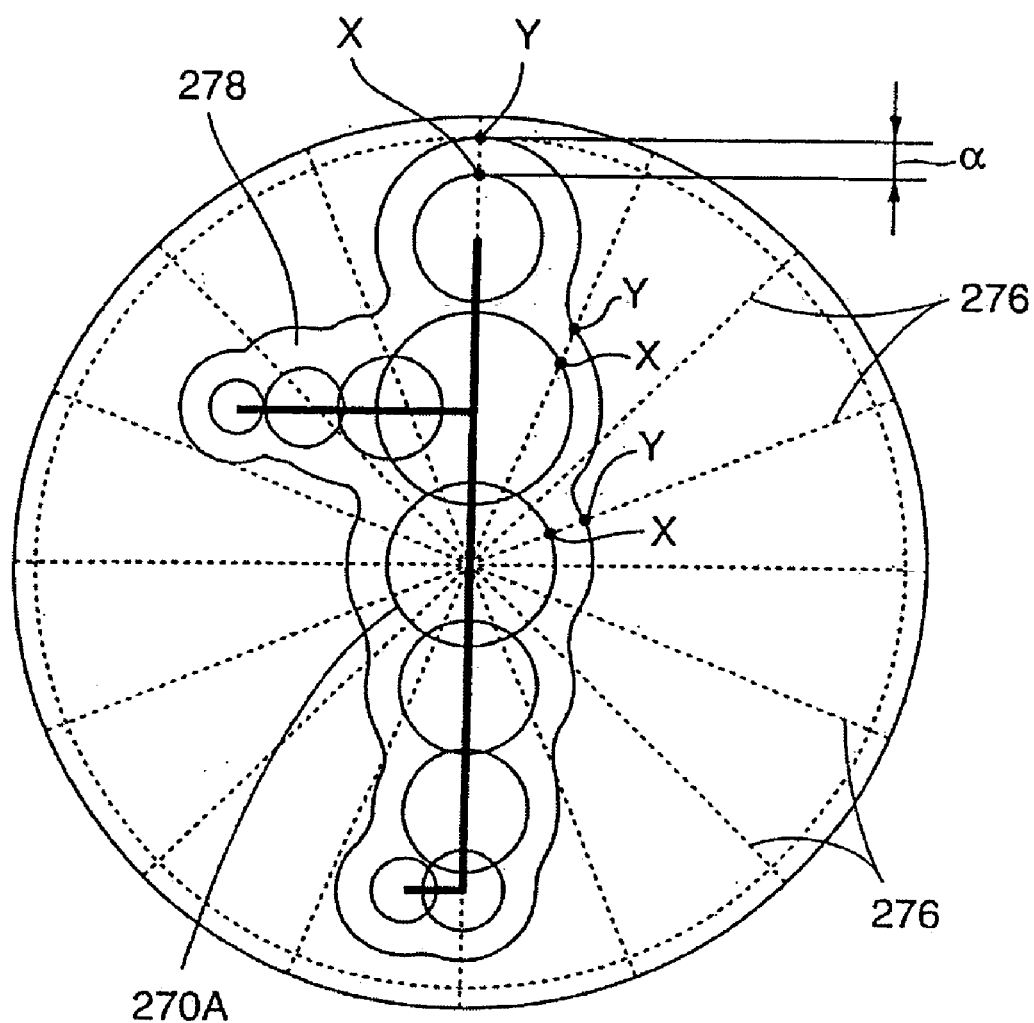
FIG. 10 is a front view on the projection screen of the object when radial lines are formed thereto.

Here, as shown in FIG. 10, when displaying the object 204 with a prescribed camera viewpoint, a projection circle 274 of the collision balls 270 provided to the respective parts of the object 204 is formed on the projection screen 272.

In this case, radial lines 276 divided into 64 segments are formed from the center of the first collision 270A as the reference. In other words, each of the angles between the radial lines 276 is approximately 5°.

Here, the point (intersecting point X) farthest from the reference point in each of the radial lines 276 and the intersecting point with each collision 270 is sought, and, when connecting the adjacent intersecting points X adjacent to each other, the connected line will form a shape approximately coinciding with the contour of the object 204.

In the present embodiment, a final contour point Y is set as the position in which a prescribed length a is extended on the radial lines 276 farther than the intersecting point X, and the area set by connecting the adjacent final contour points Y is made to be the aura generation area 278.

Since a multiangular outermost contour will be formed when connecting the final contour points as is, correction processing is performed in order to correct such multiangles into a smooth curve (spline curve) by performing derivative processing to the adjacent final contour points.

This aura 216 may be displayed by using the radial lines 276, or represented by performing gradation within the aura generation area 178.

Figure 11:
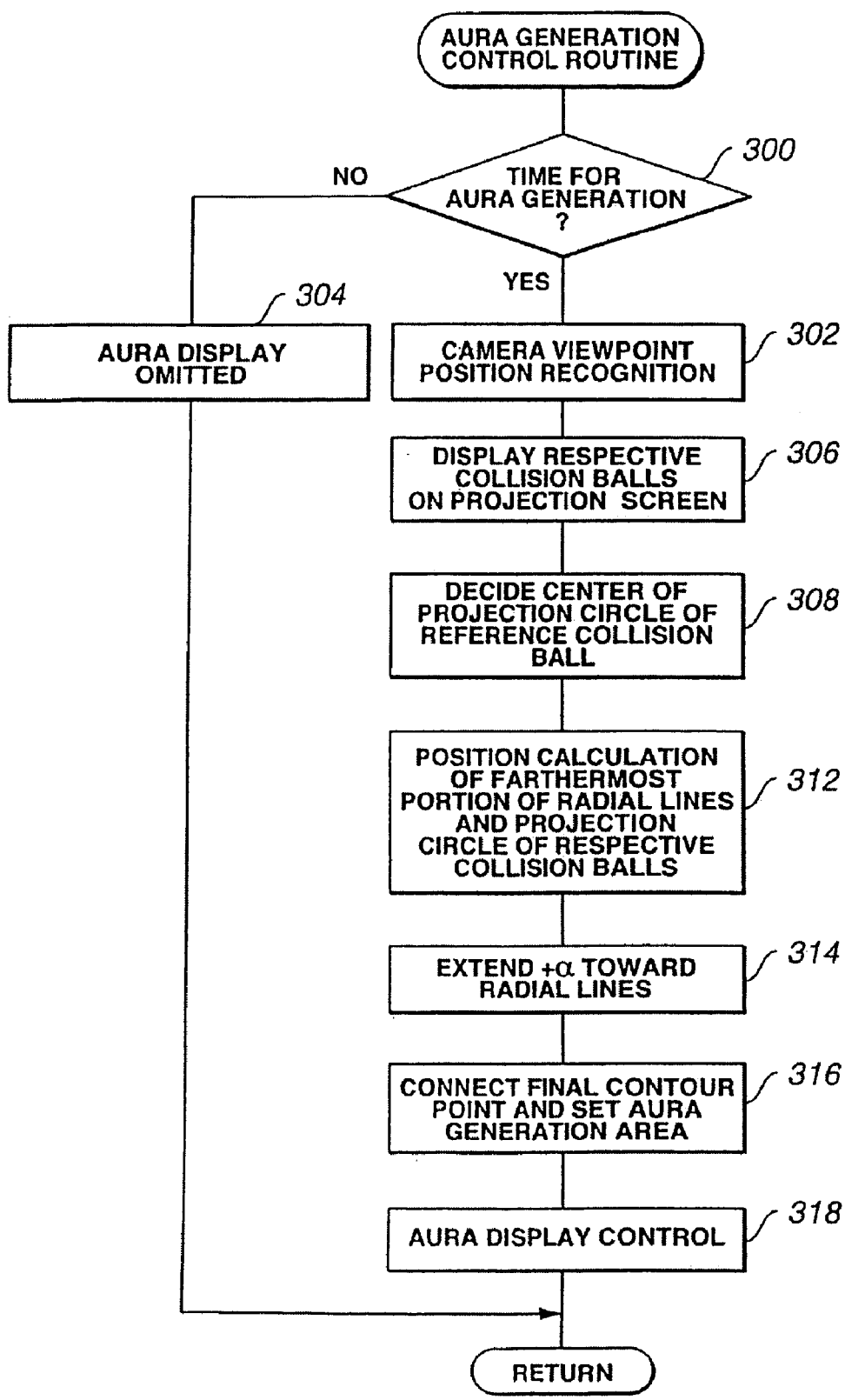
FIG. 11 is a control flowchart showing the procedures for generating an aura.

Next, the aura generation procedure is explained in accordance with the flowchart of FIG. 11. At step 300, it is judged whether it is an aura forming timing or not and, when the answer is judged as positive, the routine proceeds to step 302 in order to recognize the camera viewpoint. When this is judged as negative at step 300, the routine proceeds to step 304 and advances to the subsequent step while omitting the aura display processing.

When the camera viewpoint is recognized at step 302, the routine proceeds to step 306 in order to project the respective collisions 270 on the projection screen 272. At the subsequent step 308, the center of the projection circle 274 of the first collision 270, which is the reference collision, is fixed.

At the subsequent step 312, the intersecting point X of the farther most point in the intersecting point of the projection circle 274 of the aforementioned radial lines 276 and each collision 270 is calculated, and, at subsequent step 314, a final contour point Y is set as the position in which a prescribed length α is extended on the radial lines 276 farther than the intersecting point X.

At the subsequent step 316, the adjacent final contour points Y are connected in order to form the aura generation area. Here, the aforementioned correction processing is performed. At the subsequent step 318, an aura is displayed on the aura generation area 278, and this routine is thereby completed.

As described above, since the respective collisions 270 provided to the object 204 are projected on the projection screen 272 provided between such collisions and the camera viewpoint, numerous radial lines 276 (64 in this example) are formed with the center of the projection circle 274 of the first collision 270A as the reference, and the aura is formed thereby based on the projection circle 274 of each of the projected collisions 270, it becomes possible to display an outer circle aura along the contour of the object 204 with approximate certainty no matter which direction the object 204 is facing. In this case, since calculation is performed with the two-dimensional projection circle projected on the projection screen 272, the processing time and load are minimal and are sufficiently compatible with the movement of the game.

((6) Racket Swing Motion)

There are various swings of the racket; for instance, forehand stroke, backstroke, over throw, under throw, and so forth. Thus, the correlation of the object 204 position, the racket 210 position and the ball 212 position is prepared in a plurality of conditions in advance in the likes of an LUT, and the optimum swing mode is read on a case-by-case basis pursuant to the position of the approaching ball 212 in order to realize a realistic movement by setting the automatic movements of the object (swinging of the racket 210) to be different.

Another embodiment of the present invention is now explained. This embodiment is a modified example of the foregoing example of FIG. 6. With the embodiment of FIG. 6, a life gauge is housed in a transparent character, and the movement status (rotational speed of the heart-shaped life gauge) is made to change in accordance with the movement status of the character (a state of the character possessing much game life or a state of the character possessing little game life). In the embodiment described later, a monkey-shaped character in a transparent spherical body (ball) shows a behavior toward the moving direction of the ball.

Figure 12:
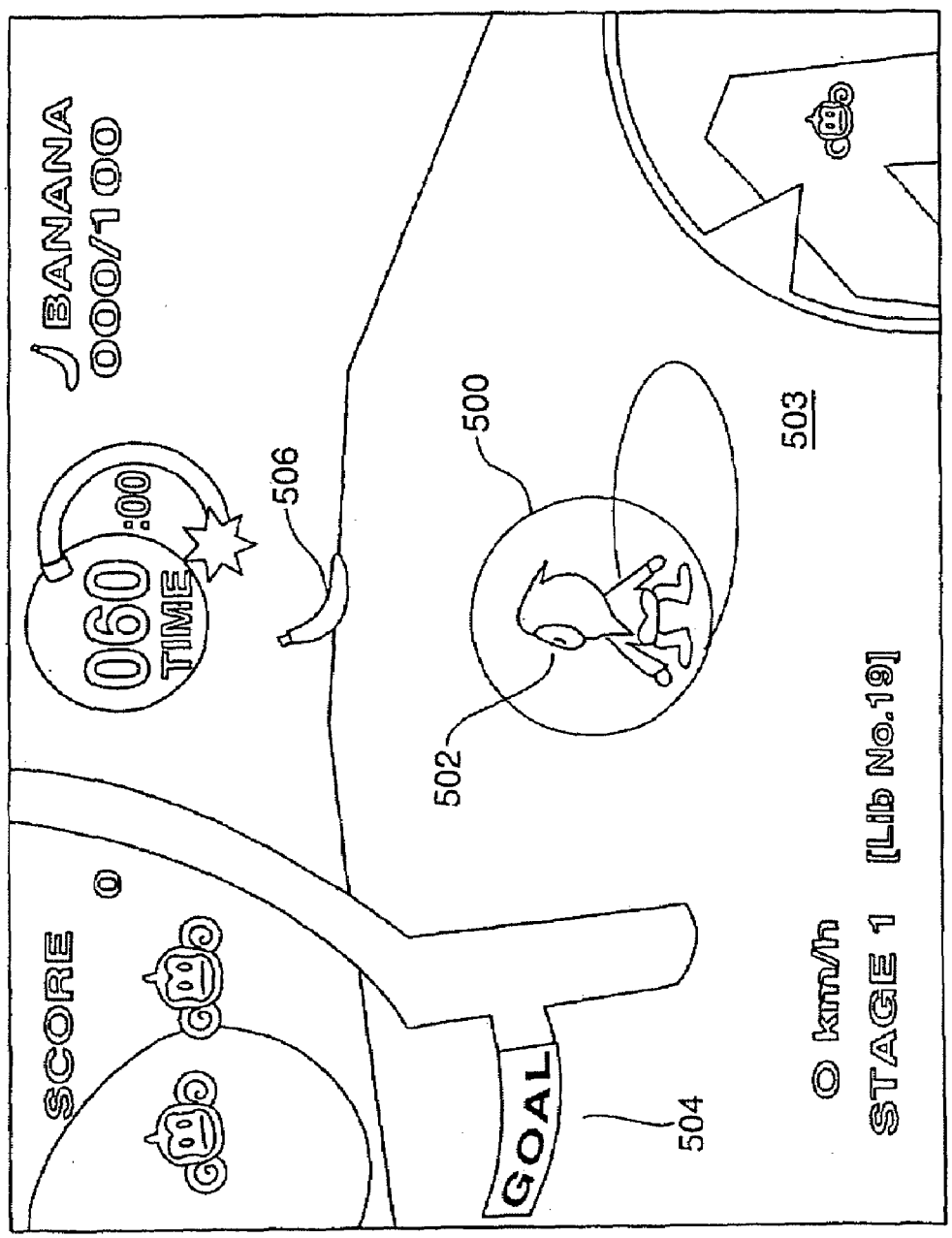
FIG. 12 is a diagram showing a game screen of another embodiment.
Figure 13:
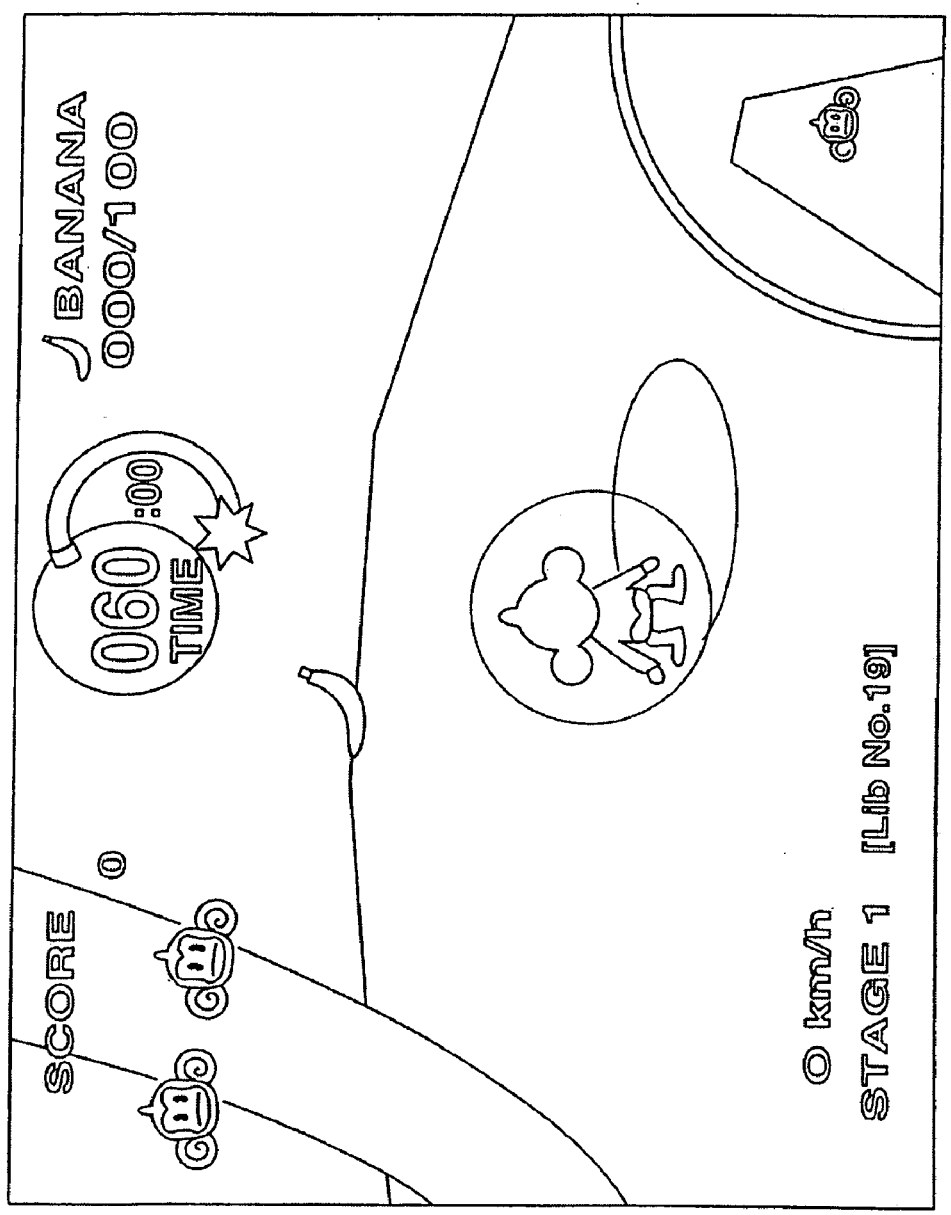
FIG. 13 is a diagram showing another game screen.

This embodiment is structured and operated as follows. FIG. 12 and FIG. 13 are representative game screens relating to the present embodiment. A game screen based on various data including data obtained by the CPU or VDP described in FIG. 1 pursuant to the operation of the controller pad by the player or a game program is displayed on the monitor.

The game content is where a character 502 (second display body) simulating a monkey enters a transparent ball 500 (first display body), and both the ball and monkey (synthesized display body) aim for the goal by the ball rolling along a determined path. In comparison to FIG. 6, the first display body is the object, and the second display body corresponds to the display information. During the course of the ball arriving at the goal, the character scores game points if the character is in the vicinity of a banana 506, which is a source of points. Game points correspond to the numerical value displayed as SCORE.

The game progresses pursuant to the operation of a game application against the image data structured from three-dimensional coordinate data with a well-known method. The character rolls on a rectangular plate face 503 floating in the air. By moving the operation lever (control pad) provided in the front of the industry-use game device body, the player is able to decide the inclination direction of the plate 503 in the air. Gravity is defined in the virtual space referred to as the game space. Thus, the ball will roll on the plate face inclined toward the gravitational direction.

The front of the character in the ball is made to face the direction in which the ball is rolling. FIG. 12 shows that the ball is rolling in an upper-left oblique direction in the diagram, and FIG. 13 shows that the ball is rolling toward the backside in the diagram.

In either case, the front of the character in the ball is facing the direction in which the ball is rolling. In order for the game device to recognize the front of the character, the front of the character is defined with a vector. By the processing means of the CPU or VDP recognizing the rolling direction of the ball, the front of the character can be aligned with the rolling direction of the ball.

In order to enable the player to recognize the character in the ball, the ball is an empty or solid spherical body, and the color data thereof is transparent data or data corresponding to a hypochromic color in which the inside can be observed. The ball may also be displayed semi-transparently, or processing may be performed so as to alternately thin out the pixels. Further, in order to make the player recognize the contour of the ball, a line is provided to the area of the ball. Thus, this is also a display body in which only the contour of the display body corresponding to the ball is displayed. As described above, the player is able to determine the rolling direction of the ball (direction in which the plate is inclined) by the direction (front direction of the character) to which the character inside the ball is facing.

When the ball is rolling along a straight line, a scene of the character inside the ball strolling along is provided to the player. When the ball is being prevented from falling off the plate, a representation of a behavior where the character inside the ball is on its hands and knees showing resistance or haste in order to keep the ball from falling is adopted in the game machine. Since the area outside the plate is set as a space where gravity exists in the real world, if the ball falls off the plate, the ball drops toward the bottom of the screen.

Figure 14:
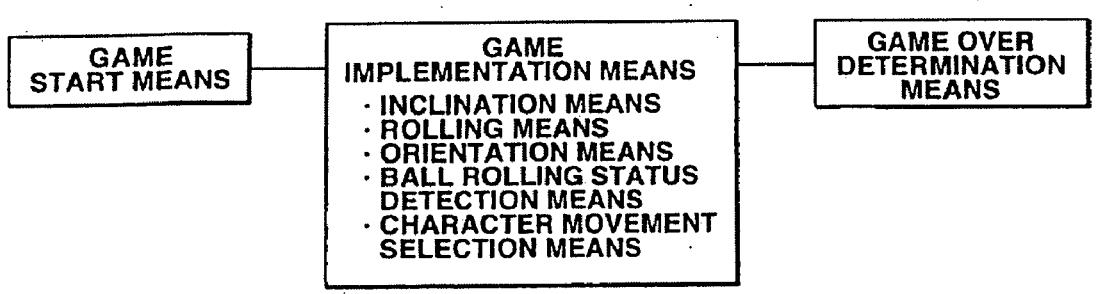
FIG. 14 is a functional block diagram to be implemented by the image processing means according to the present embodiment.

The processing means (CPU, VDP) of the image processing device of the game machine described in FIG. 1 exhibits the functions described with the following functional blocks in order to realize the foregoing movements. Please refer to FIG. 14.

When the game is started with the game start means, the game is executed based on the player's input orders of the input means. The game execution means comprises plate face inclination means; rolling means for rolling the ball in the gravitational direction on the inclined plate face; orientation direction for detecting the rolling direction of the ball and making the front of the character face such direction; ball rolling status detection means for detecting the rolling status of the ball (rolling in a straight line, rolling in a curve, the ball swaying and rolling as though about to fall off the plate face, and so on); and means for selecting the movement of the character matching the rolling status of the ball (mode of the character strolling along when the ball is rolling in a straight line, mode of the character in a haste when the ball is about to fall off, and so on), and the image processing means comprises means for judging whether the game is over.

Figure 15:
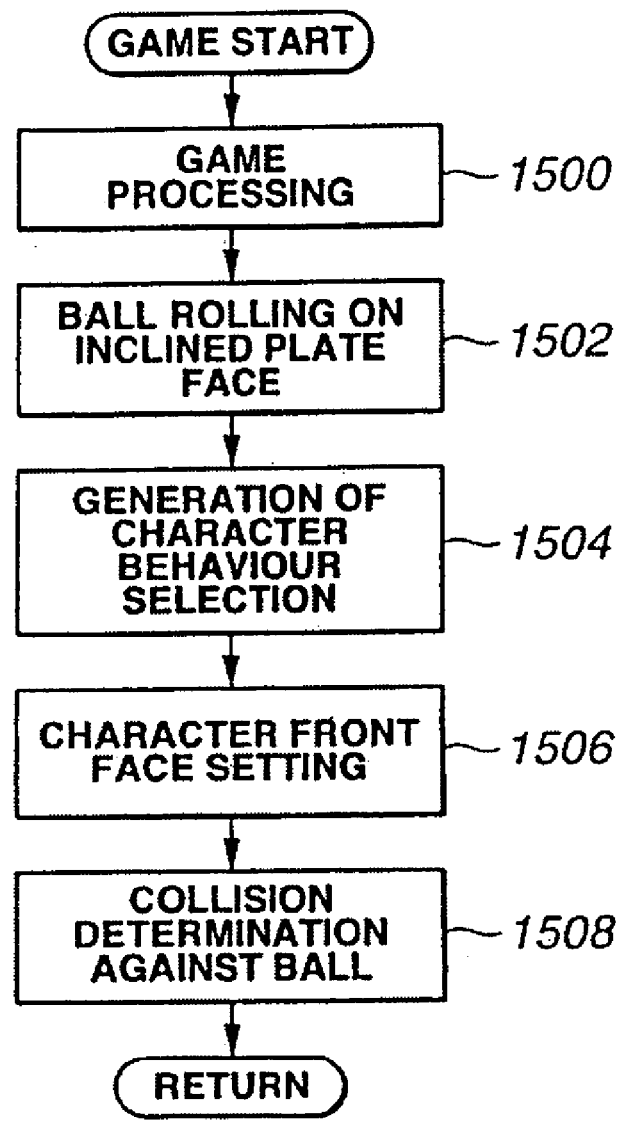
FIG. 15 is a flowchart to be implemented by this image means.

This is now explained in detail based on the flowchart of FIG. 15. When the game is started, the image processing means reads the image data and application software in the memory, and realizes the aforementioned game processing based on this program, image data, and the data input from the input means of the game device (1500).

Foremost, when the game is started, the course is displayed on the screen. Next, the character inside the ball is disposed at the starting point of the course. A prescribed time limit is provided. The operational signal from the operation means operated by the player is read. The plate face structuring the course is inclined toward a prescribed direction based on the operational signal (1502). The ball is rolled in this direction.

The character is displayed to match the mode of the rolling of the ball. The character behavior described above arises during the process of such processing (1504). In other words, a behavior of the character that is strolling along or flapping its hands and feet so as to resist falling from the course, is adopted.

Next, the rolling direction of the ball is detected, and the front direction of the character is set to this direction (1506). Then, the collision of the ball and plate surface, i.e., whether there is an overlap or contact of coordinates, is determined. When there is a contact, the ball has not fallen from the plate face and it is still on the plate face. When the ball is not on the plate face, the ball is made to drop from the course (1508).

Then, it is decided whether it is within the time limit, and the ball is mandatorily returned to the starting point when exceeding the time limit. As a modified example, the ball may be returned to the starting point of the previous stage. When within the time limit, it is determined whether the goal has been reached, and the game proceeds to the subsequent stage when the goal has been reached. Thereafter, it is judged whether it is game over or not, and the game over is judged in accordance with the game results.

In this embodiment, the aforementioned collision determination is implemented between the ball (spherical body) and the plate face. Since the spherical body is defined pursuant to a certain radius from the center point thereof, the collision determination of the floor area and the spherical body can be calculated simply. By housing a monkey, which cannot be approximated with a simple shape, in the spherical body, only the collision between the spherical body (subject of collision determination) and the floor area (other subject of collision determination) needs to be determined, and the determination result is accurate.

Moreover, since the player is able to see through to the character (second display body) in the ball (first display body), the player is able to recognize the character inside of the ball from every direction. Although the front of the character (monkey) inside the ball was made to face the moving direction of the ball, the behavior or form of the monkey-shaped character may be modified or adjusted in correspondence with the movement of the ball. As a modified example of the above, the following example may be adopted. The behavior of the monkey may be changed in accordance with the speed of the ball. Or, the display body on the outside may be changed in accordance with the movement of the monkey.

Further, in this embodiment also, a plurality of synthesized display bodies may be provided for each participating player. In addition, information of the game result or the like may be overlapped on the first display body and/or second display body as the third display body.

Effect of the Invention

The image display control method in a 3D image and the device thereof, as well as a recording medium and game device having recorded thereon such image display control method according to the present as described above yield a superior effect enabling the player to maintain the virtual feeling in the game without losing the balance of the image by displaying text or the like as though a telop on the screen, and preventing the deterioration in game amusement by yielding a sense of unity with the game screen even in a sporadic text display.

Moreover, in addition to the foregoing effect, two or more types of information are obtained upon suppressing the shifting of the player's viewpoint as much as possible.

Further, when complex operations are necessary by the player, he/she may concentrate on such complex operation by the other elements, which ordinarily require consideration, being simplified.

In addition, upon generating an aura, which is a means for reinforcing an object of a main character class, only a simple image processing is required to match the aura with the contour of such object and accommodate even complex movements.

What is claimed is:

1. An image processing device which places display bodies within a virtually-defined three-dimensional space, creates a picture of the display bodies viewed from a virtual viewpoint with image processing means, and displays the picture on display means, said image processing means comprising:
   display body setting means for setting a plurality of display bodies within said three-dimensional space;
   display body disposal means for overlappingly disposing within a first of the plurality of display bodies, a second of the plurality of display bodies;
   display body image setting means for setting an image of the first of the plurality of display bodies such that the second of the plurality of display bodies becomes visible; and
   display body movement mode reflection means for making at least one movement mode of the one of the first of the plurality of display bodies reflect a movement mode of the second of the plurality of display bodies, wherein the second of the plurality of display bodies is displayed in differing shapes depending on the movement mode of the one of the first of the plurality of display bodies.

2. An image processing device according to claim 1, wherein the first of the plurality of display bodies is transparent and the second of the plurality of display bodies is opaque.

3. The image processing device according to claim 1 or claim 2, wherein said display body movement mode reflection means comprises:
   display body movement detection means for detecting a movement of one of the first or the second of the plurality of display bodies; and
   movement adjustment means for creating a movement matching the detected movement in the other of the first or second of the plurality of display bodies.

4. The image processing device according to claim 3, wherein:
   said display body movement detection means comprises display body moving direction detection means for detecting a moving direction of one of the first or second display bodies, and
   said movement adjustment means comprises means for creating an orientation or a moving direction of the other of the first or the second of the plurality of display bodies.

5. An image processing device according to claim 1, wherein periodic motion associated with the second of the plurality of display bodies varies depending on movement speed of the one of the first of the plurality of display bodies.

6. An image processing device according to claim 1, wherein behavior associated with the second of the plurality of display bodies varies depending on the movement mode of the one of the first of the plurality of display bodies.

7. A game device comprising an image processing device which places display bodies within a virtually-defined three-dimensional space, creates a picture of the display bodies viewed from a virtual viewpoint with image processing means, and displays the picture on display means, said image processing device comprising:
   display body setting means for setting a plurality of display bodies within said three-dimensional space;
   display body disposal means for overlappingly disposing within a first of the plurality of display bodies, a second of the plurality of display bodies;
   display body image setting means for setting an image of the first of the plurality of display bodies such that the second of the plurality of display bodies becomes visible; and
   display body movement mode reflection means for making at least one movement mode of the one of the first of the plurality of display bodies reflect a movement mode of the second of the plurality of display bodies, wherein the second of the plurality of display bodies is displayed in differing shapes depending on the movement mode of the one of the first of the plurality of display bodies.

8. A computer program product employed in an image processing device which places a display body within a virtually-defined three-dimensional space, creates a picture of the display body viewed from a virtual viewpoint with image processing means, and displays the picture on display means, said computer program product storing instructions for execution by a computer to:
   set a plurality of display bodies;
   overlappingly dispose within a first of the plurality of the display bodies, a second of the plurality of display bodies;
   set an image of the first of the plurality of display bodies such that the second of the plurality of display bodies becomes visible; and
   make at least one movement mode of the first of the plurality of display bodies reflect a movement mode of the second of the plurality of display bodies, wherein the second of the plurality of display bodies is displayed in differing shapes depending on the movement mode of the one of the first of the plurality of display bodies.

9. A storage medium storing a program employed in an image processing device which places a display body within a virtually-defined three-dimensional space, creates a picture of the display body viewed from a virtual viewpoint with image processing means, and displays the picture on display means, said program instructing a computer to:
   set a plurality of display bodies;
   overlappingly dispose within a first of the plurality of the display bodies, a second of the plurality of display bodies;
   set an image of the first of the plurality of the display bodies such that the second of the plurality of display bodies becomes visible; and
   make at least one movement mode of the first of the plurality of display bodies reflect a movement mode of the second of the plurality of the display bodies, wherein the second of the plurality of display bodies is displayed in differing shapes depending on the movement mode of the one of the first of the plurality of display bodies.

* * * * *